(No Model.)
I. A. TIMMIS.
SECONDARY BATTERY.
No. 398,194. Patented Feb. 19, 1889.
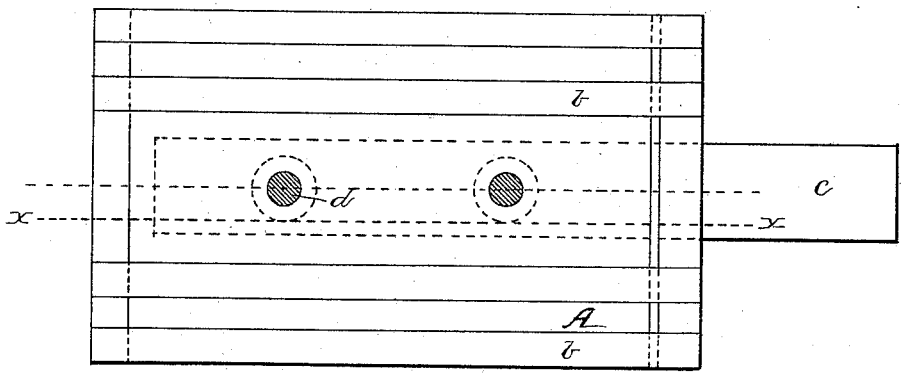
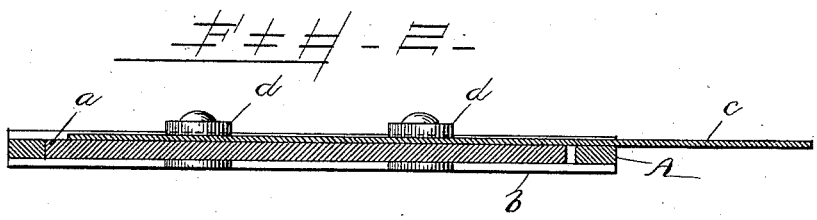
WITNESSES
Albert B. Blackwood
L. Paul.
INVENTOR
Illius A. Timmis
By Connolly Bros
Attÿs

UNITED STATES PATENT OFFICE.

ILLIUS AUGUSTUS TIMMIS, OF 2 GREAT GEORGE STREET, WESTMINSTER, COUNTY OF MIDDLESEX, ENGLAND.

SECONDARY BATTERY.

SPECIFICATION forming part of Letters Patent No. 398,194, dated February 19, 1889.

Application filed October 1, 1888. Serial No. 286,863. (No model.)

*To all whom it may concern:*

Be it known that I, ILLIUS AUGUSTUS TIMMIS, a subject of the Queen of Great Britain, residing at 2 Great George Street, Westminster, in the county of Middlesex, England, have invented certain new and useful Improvements in the Elements for Secondary Batteries; and I do hereby declare the following to be a full, clear, and exact description of the invention, reference being had to the accompanying drawings, which form part of this specification.

The objects of my invention are to cheapen the production, lessen the weight, and perfect the action of the positive elements (or, as they are called, the "cathodes") of secondary batteries. With these objects in view I make these elements (or cathodes) of litharge in combination with a suitable solution, preferably sulphate of ammonia, solid—*i. e.*, in a block, or rather cake or slab, of any convenient size and thickness—and reduce them in the ordinary way—that is, I dispense with the use of grids or racks or any of the numerous supports made of conducting material devised to support the litharge or reduced material. The supports I make of any inoxidizable material that I can use—such as ebonite or other suitable material—and by this means I overcome buckling and the consequent destruction of the plates, and I make the contacts preferably of lead, which I fasten against the plates or elements with inoxidizable nuts and bolts or clamps or by any other suitable means.

Figure 1 is a front elevation of the plate, and Fig. 2 is a vertical section of the same.

*a* represents the plate, which is made of litharge in combination with sulphate of ammonia or other suitable solution, this plate being made of any convenient size and thickness.

*b* is the support, which is made of any inoxidizable material, such as ebonite.

*c* is the contact, made preferably of lead, which is fastened against the plates by means of nuts and bolts *d d* or by other suitable means; or the contact *c* can be embedded in the plate of litharge, A.

Having now described the nature of my said invention and the manner in which it can be carried into effect, I declare that what I claim is—

1. An element for secondary batteries, consisting of a plate composed of litharge and a solution of sulphate of ammonia, and a supporting-frame, substantially as described.

2. An element for secondary batteries, consisting of a plate composed of litharge and sulphate of ammonia, and a supporting-frame of ebonite, substantially as described.

3. An element for secondary batteries, consisting of a plate composed of litharge and a solution of sulphate of ammonia, and a supporting-frame of inoxidizable material, substantially as described.

In testimony that I claim the foregoing I have hereunto set my hand this 21st day of August, 1888.

ILLIUS AUGUSTUS TIMMIS.

Witnesses:
  TOBIAS GAINSPED RIDGWAY,
 *5. Waterloo Place, London, Notary.*
  AMBROSE FISH,
 *Notary's Clerk, 5 Waterloo Place, S. W.*